(12) United States Patent
Wright et al.

(10) Patent No.: US 9,226,448 B2
(45) Date of Patent: Jan. 5, 2016

(54) LAWN MOWER WITH ADJUSTABLE REAR DRIVE WHEELS

(75) Inventors: Edward R. Wright, Dickerson, MD (US); Luke B. Waesche, Hagerstown, MD (US); William R. Wright, Clarksburg, MD (US)

(73) Assignee: Wright Manufacturing, Inc., Frederick, MD (US)

( * ) Notice: Subject to any disclaimer, the term of this patent is extended or adjusted under 35 U.S.C. 154(b) by 925 days.

(21) Appl. No.: 11/503,411

(22) Filed: Aug. 14, 2006

(65) Prior Publication Data

US 2008/0034722 A1 Feb. 14, 2008

(51) Int. Cl.
| | |
|---|---|
| *A01D 34/00* | (2006.01) |
| *A01D 69/00* | (2006.01) |
| *B62D 49/06* | (2006.01) |
| *B62D 53/06* | (2006.01) |
| *A01D 34/69* | (2006.01) |

(52) U.S. Cl.
CPC ............... *A01D 69/00* (2013.01); *A01D 34/69* (2013.01); *B62D 49/0678* (2013.01); *B62D 53/068* (2013.01)

(58) Field of Classification Search
USPC ............. 56/1, 2, 5, 10.2 R, 14.7, 17.2, 16.7
See application file for complete search history.

(56) References Cited

U.S. PATENT DOCUMENTS

| | | | | |
|---|---|---|---|---|
| 4,422,283 A | * | 12/1983 | Scanland | 56/320.2 |
| 5,221,103 A | * | 6/1993 | Ehrlich | 280/405.1 |
| 5,809,755 A | * | 9/1998 | Velke et al. | 56/10.8 |
| 5,946,894 A | * | 9/1999 | Eavenson et al. | 56/16.7 |
| 5,984,031 A | | 11/1999 | Velke et al. | |
| 6,085,504 A | | 7/2000 | Wright et al. | |
| 6,301,865 B1 | * | 10/2001 | Velke et al. | 56/16.7 |
| 6,434,917 B1 | * | 8/2002 | Bartel | 56/11.3 |
| 6,442,917 B1 | | 9/2002 | Velke et al. | |
| 6,640,526 B2 | | 11/2003 | Velke et al. | |
| 6,658,831 B2 | | 12/2003 | Velke et al. | |
| 6,688,089 B2 | | 2/2004 | Velke et al. | |
| 6,868,658 B2 | | 3/2005 | Velke et al. | |
| 6,935,093 B2 | | 8/2005 | Velke et al. | |

* cited by examiner

*Primary Examiner* — Alicia Torres
(74) *Attorney, Agent, or Firm* — Nixon & Vanderhye P.C.

(57) ABSTRACT

A self-propelled lawn mower including at least one cutting blade and at least first and second rear drive wheels. Hydro pumps are provided for controlling the drive wheels. Optionally, a grass collection system may be mounted on the mower, with much of the system being located laterally rearward of the rear drive wheels so that the center of gravity of the mower is shifted rearwardly. In order to compensate for such a center of gravity shift, the respective positions of the rear drive wheels are adjustable. In certain example embodiments of this invention, the lateral position of the rear drive wheels may be selectively adjusted as desired by the operator (e.g., to move the center of gravity of the mower forward relative to the rear drive wheels in order to compensate for the added rear-heavy weight of the grass collection system).

7 Claims, 13 Drawing Sheets

Fig. 1

PRIOR ART

Fig. 13

LAWN MOWER WITH ADJUSTABLE REAR DRIVE WHEELS

This invention relates to self-propelled lawn mower including at least one cutting blade and at least first and second rear drive wheels. Hydro pumps are provided for controlling the drive wheels. Optionally, a grass collection system may be mounted on the mower, with much of the system being located laterally rearward of the rear drive wheels so that the center of gravity of the mower is shifted rearwardly. In order to compensate for such a center of gravity shift, the respective positions of the rear drive wheels are adjustable. In certain example embodiments of this invention, the lateral position of the rear drive wheels may be selectively adjusted as desired by the operator (e.g., to move the center of gravity of the mower forward relative to the rear drive wheels in order to compensate for the added rear-heavy weight of the grass collection system).

BACKGROUND OF THE INVENTION

Figure 1:
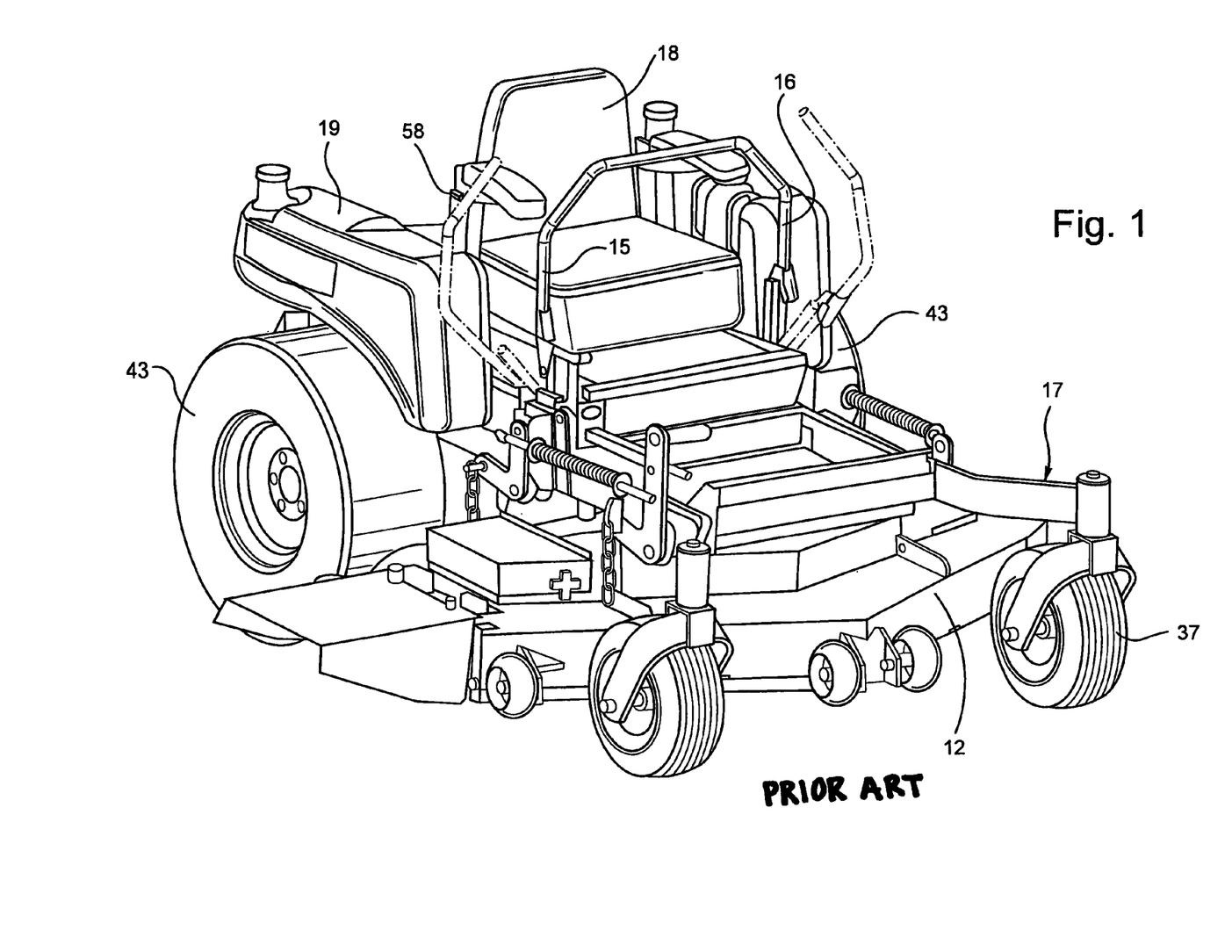
FIG. 1 is a perspective view of a conventional zero radius turning riding mower.

FIG. 1 is a perspective view of a known mower, typically referred to as a mid-mount Z type mower. The mid-mount Z mower of FIG. 1 includes a pair of rear drive wheels 43 each of which is driven by a hydro (hydrostatic or hydraulic) pump so that two pumps are provided, steering levers 15, 16, frame 17, cutter or mower deck assembly 12 below which the blades cut grass, operator seat 18 for a seated operator, gas tank 19, combustion engine 58 located behind the seat, and front caster wheels 37. The mower is a zero radius turning self-propelled power lawn mower, and includes first and second hydro pumps (not shown) for controlling first and second corresponding wheel motors (not shown), so that the first and second independently driven rear drive wheels 43 may be driven independently in order to conduct zero radius turns.

It is known to attach large grass collection systems to self-propelled lawn mowers. Some grass collection systems include a grass storage compartment located rearward of the seat and engine of the mower. Such grass collection systems can weigh as much as approximately two hundred pounds or more when holding grass. This significant added weight can be problematic, especially when the grass collection system is such that the grass is collected and/or stored rearwardly of the mower's rear drive wheels (e.g., the mower may "pop wheelies" during operation). In order to compensate for this added rearward weight, it is known in the art to add metal counterweights to the front of the mower so as to reduce the likelihood of the mower popping wheelies during normal mower operations.

Unfortunately, the use of such counterweights on the front of the mower to offset the grass collector weight is problematic in that it can shorten the useful life of the mower. In particular, the use of such counterweights can lead to premature failure of a mower's hydraulic system which is very expensive to repair. Mower hydraulic systems, including the hydro pumps which control the rear drive wheel motors, are made to operate in a satisfactory manner up to about 2,000 psi. However, when too much weight is placed on the front and rear of the mower, the psi level can reach up to about 3,000 to 5,000 psi during mowing operations; when this occurs the hydraulic system can start to leak internally and extreme heat can be generated. This causes the hydraulic oil to deteriorate and leads to a too low viscosity. These occurrences lead to premature failure of the hydraulic system and thus of the mower.

In view of the above, it will be apparent that there exists a need in the art for an improved way in which to compensate for significant amounts of weight which may be added to a rear portion of a mower such as via a grass collection system.

BRIEF SUMMARY OF EXAMPLE EMBODIMENTS OF THE INVENTION

In certain example embodiments of this invention, a self-propelled lawn mower is provided so as to include at least one cutting blade and at least first and second drive wheels (e.g., rear drive wheels). Hydro pumps of a hydraulic system are provided for controlling the drive wheels. Optionally, a grass collection system may be mounted on the mower, with much of the system being located laterally rearward of the rear drive wheels so that the center of gravity of the mower is shifted rearwardly due to the addition of the grass collection system. In order to compensate for such a center of gravity shift, the respective positions of the rear drive wheels are adjustable in certain example embodiments of this invention. In certain example embodiments of this invention, the lateral position of the rear drive wheels may be selectively adjusted as desired by the operator in order to move the center of gravity of the mower forward relative to the rear drive wheels in order to compensate for the added weight at the rear portion of the mower due to the grass collection system.

In certain example embodiments of this invention, there is provided a self-propelled lawn mower comprising: first and second rear drive wheels; a first pump for controlling the first drive wheel, and a second pump for controlling the second drive wheel, the first and second drive wheels being independently drivable via the pumps in both forward and reverse directions so as to permit zero radius turning of the mower, and wherein a first wheel motor is provided between the first rear drive wheel and the first pump and a second wheel motor is provided between the second rear drive wheel and the second pump; at least one cutting blade for cutting grass, the cutting blade being part of a cutter deck assembly; an engine mounted on an upper surface of an engine deck; means for mounting a grass collection system on the mower, the grass collection system including a grass collecting container adapted to be mounted rearwardly of the rear drive wheels and/or a seat of the mower; and adjustment means for adjusting the lateral positions of the rear drive wheels relative to a frame of the mower, the adjustment means for permitting the rear drive wheels to be moved rearward/forward in order to compensate for weight added or removed by addition or removal of the grass collecting container.

In other example embodiments of this invention, there is provided a method of adjusting a self-propelled lawn mower, the method comprising: providing a self-propelled lawn mower including first and second rear drive wheels; at least one pump for controlling the drive wheels, the first and second drive wheels being independently drivable in both forward and reverse directions so as to permit zero radius turning of the mower, and wherein a first wheel motor is provided for the first rear drive wheel and a second wheel motor is provided for the second rear drive wheel; mounting a grass collection system on the mower, the grass collection system including a grass collecting container mounted at least partially rearwardly of the rear drive wheels of the mower; and adjusting the lateral positions of the rear drive wheels relative to a frame of the mower thereby permitting the rear drive wheels to be moved rearward/forward in order to compensate for weight added by addition of the grass collecting container.

In still further example embodiments of this invention, there is provided a self-propelled lawn mower comprising: first and second rear drive wheels; at least one pump for controlling the first and second drive wheels, the first and second drive wheels being independently drivable in both forward and reverse directions so as to permit zero radius turning of the mower, and wherein a first wheel motor is provided for the first rear drive wheel and a second wheel motor is provided for the second rear drive wheel; at least one cutting blade for cutting grass, the cutting blade being part of a cutter deck assembly; adjacent each of the first and second drive wheels, first, second, third and fourth sets of holes being defined in a vertically extending wall of the mower, wherein each of the first, second, third and fourth sets comprises a plurality of holes aligned in a linear manner for adjusting lateral positions of the rear drive wheels relative to a frame of the mower.

DETAILED DESCRIPTION OF EXAMPLE EMBODIMENTS OF THE INVENTION

Referring now more particularly to the accompanying drawings in which like reference numerals indicate like parts throughout the several views.

Figure 2:
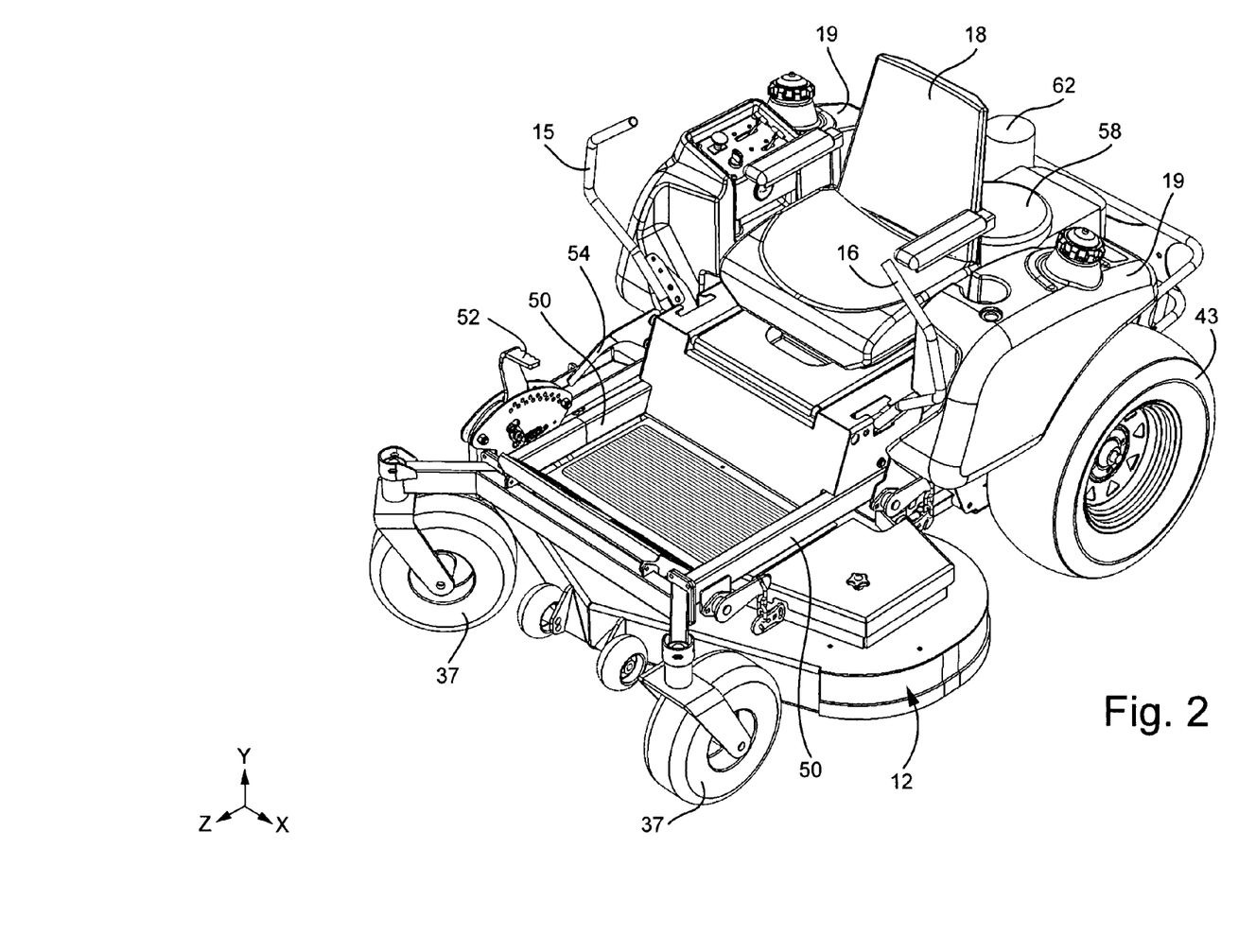
FIG. 2 is a perspective view of a zero radius turning lawn mower according to an example embodiment of this invention.
Figure 3:
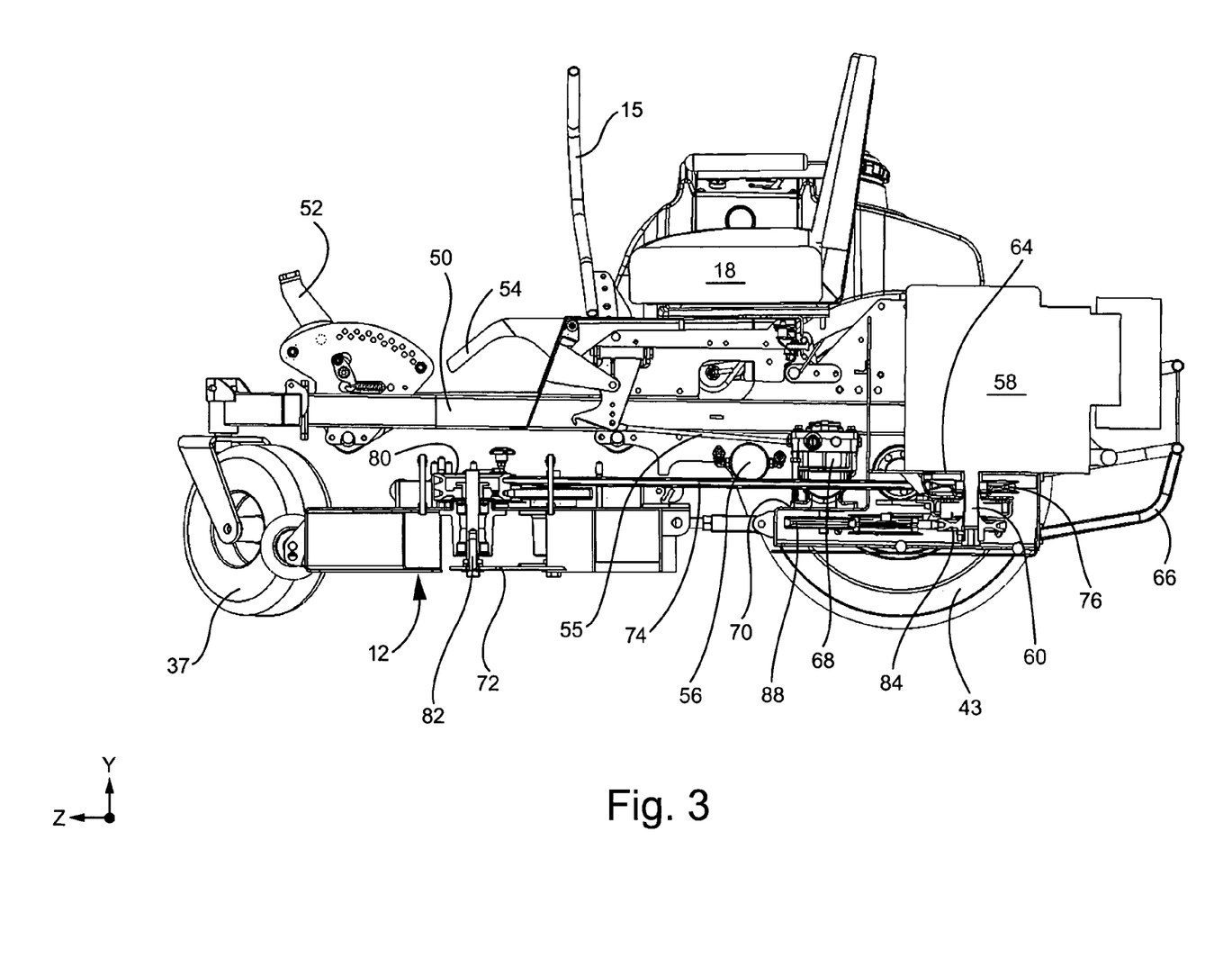
FIG. 3 is a side cross sectional view of the mower of FIG. 2.
Figure 4:
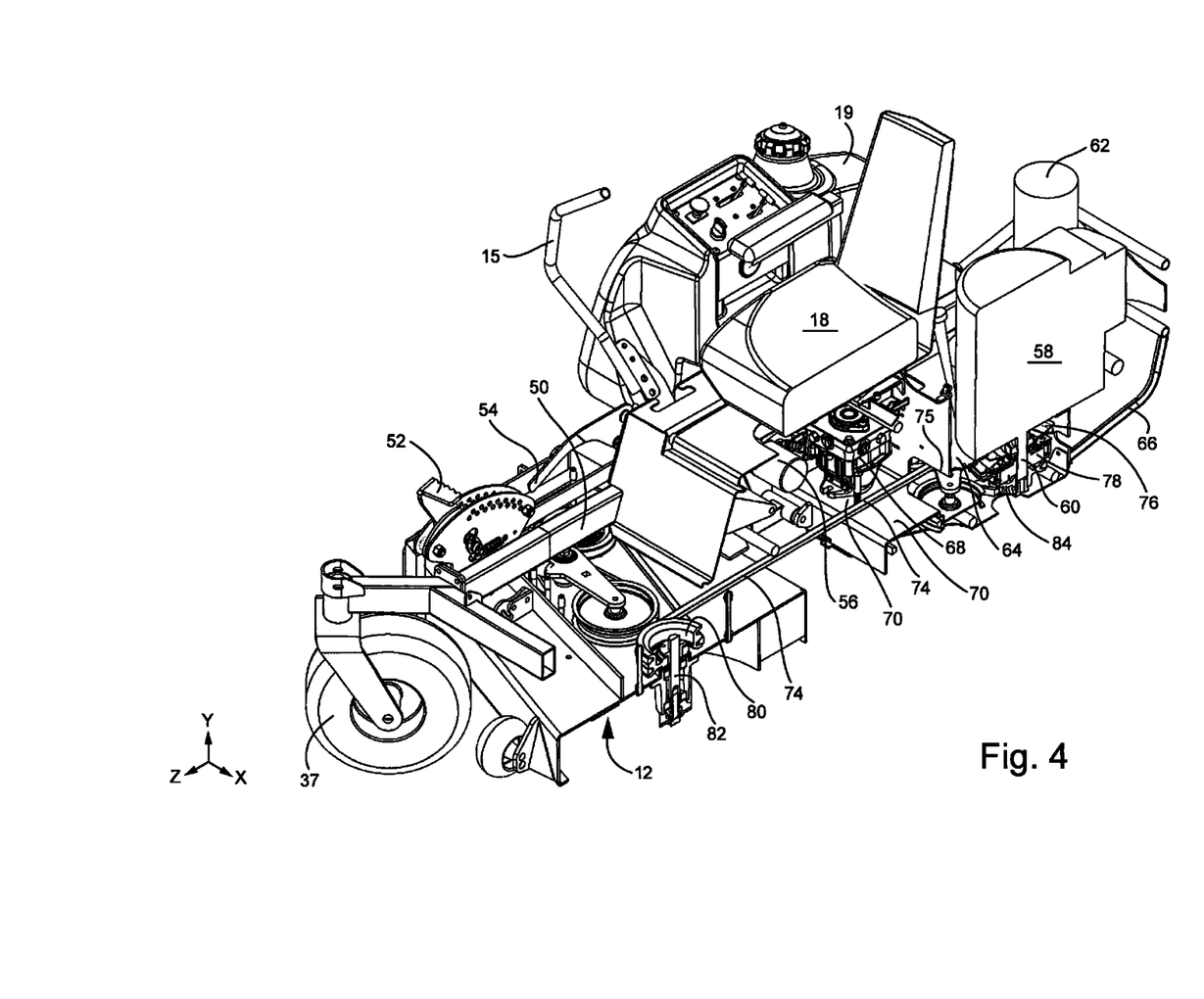
FIG. 4 is a split perspective view of the mower of FIGS. 2-3, showing the right half of the mower only, for purposes of illustration and understanding (the mower has been sliced down the middle in FIG. 4 so that only the right half of the mower is illustrated, and parts that have been sliced are shown cross sectionally).
Figure 5:
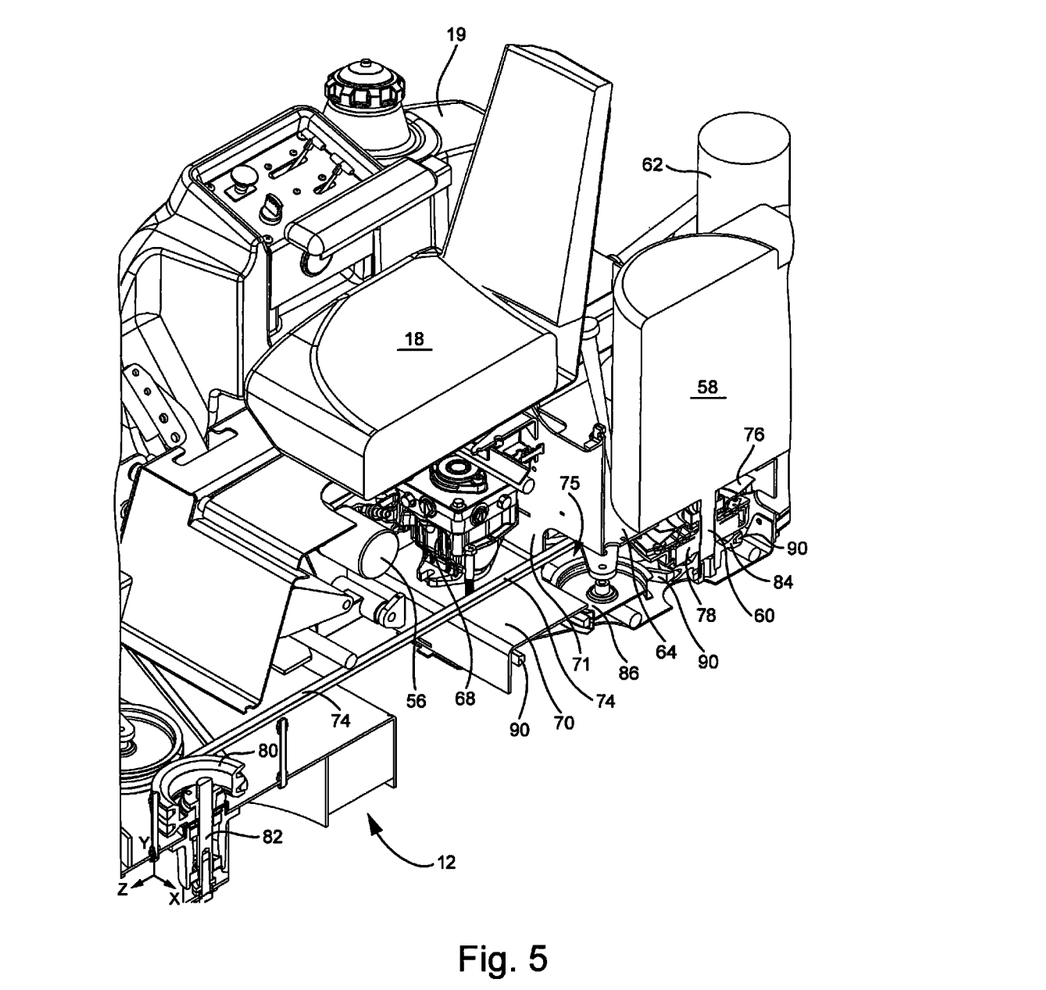
FIG. 5 is a close-up split perspective view of the mower of FIGS. 2-4, showing the right half of the mower only, for purposes of illustration and understanding (the mower has been sliced down the middle in FIGS. 4-5 so that only the right half of the mower is illustrated, and parts that have been sliced are shown cross sectionally).
Figure 6:
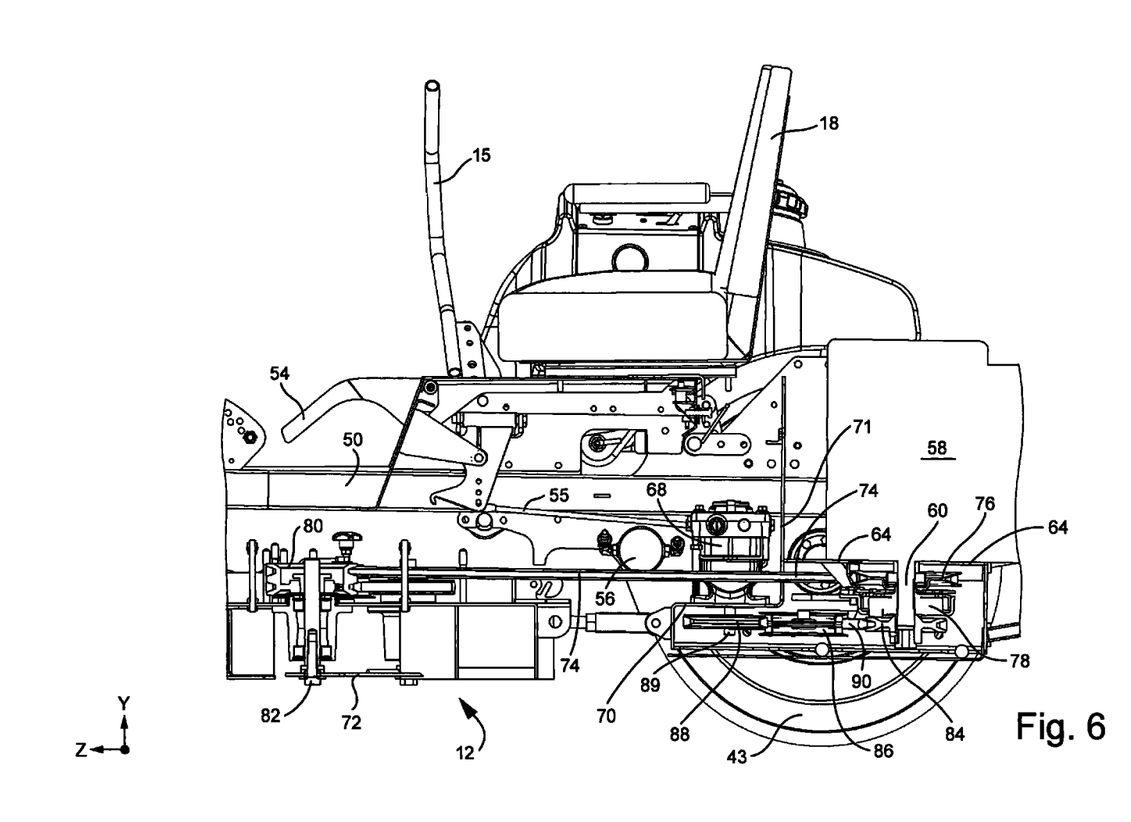
FIG. 6 is a close-up side cross sectional view of the mower of FIGS. 2-5, where the section line is taken where the slice is shown in FIGS. 4-5.
Figure 7:
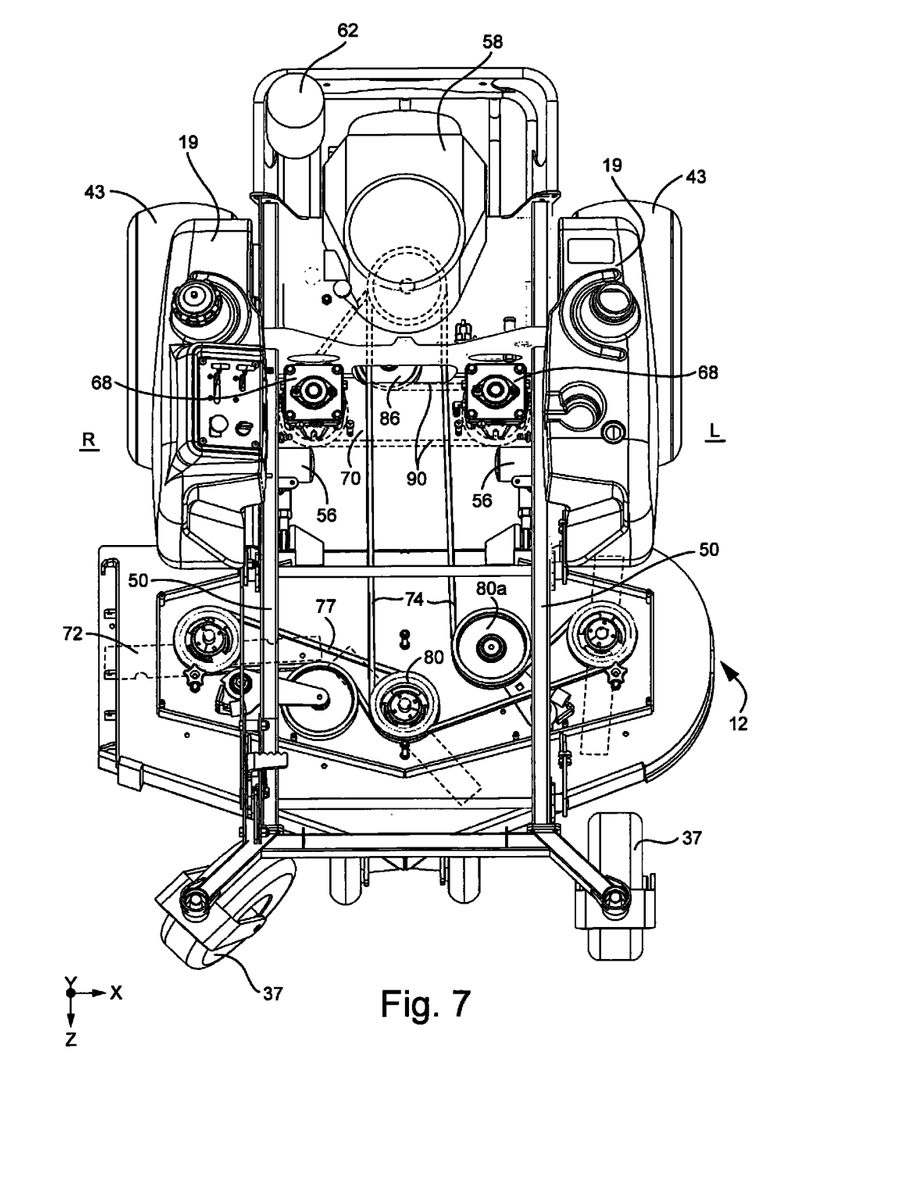
FIG. 7 is a top plan view of the mower of FIGS. 2-6, although certain components of the mower are either not shown or are translucent in this figure for purposes of illustration and understanding.
Figure 8:
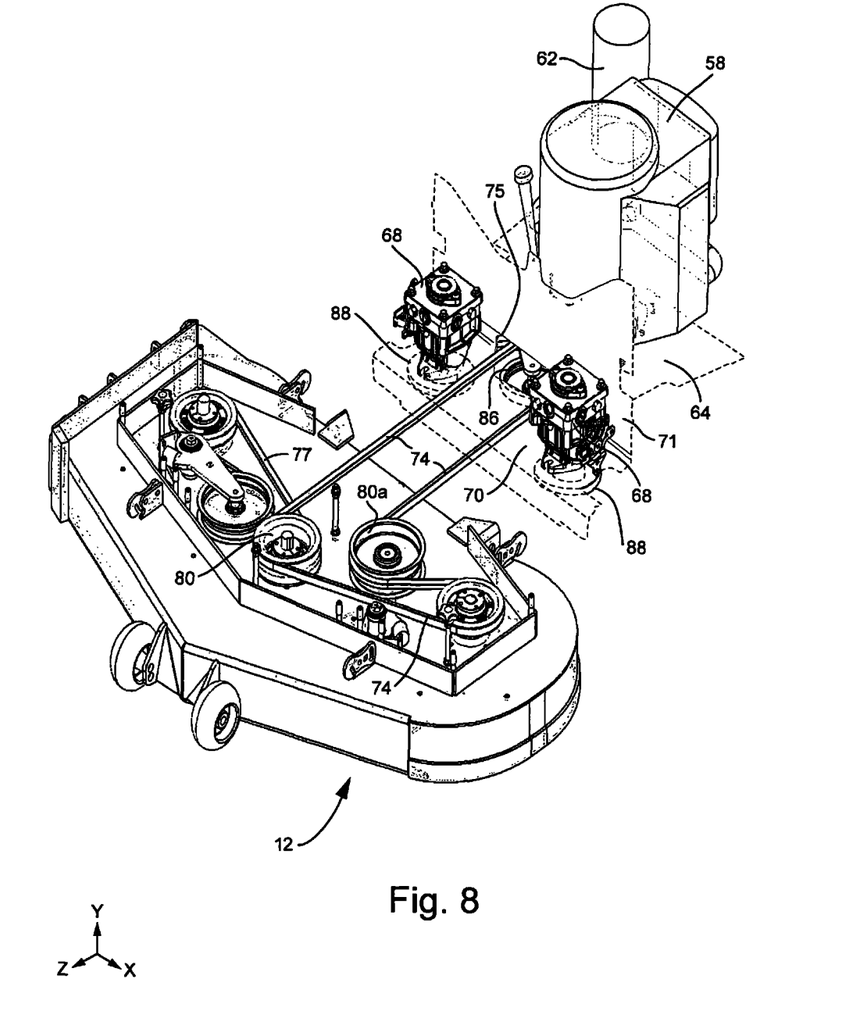
FIG. 8 is a perspective view of certain components of the mower including the cutter deck assembly, cutter deck pulleys, cutter deck drive belt, pumps and engine of the mower of FIGS. 2-7 (other parts are either omitted from or translucent in this figure for purposes of illustration and understanding).
Figure 9:
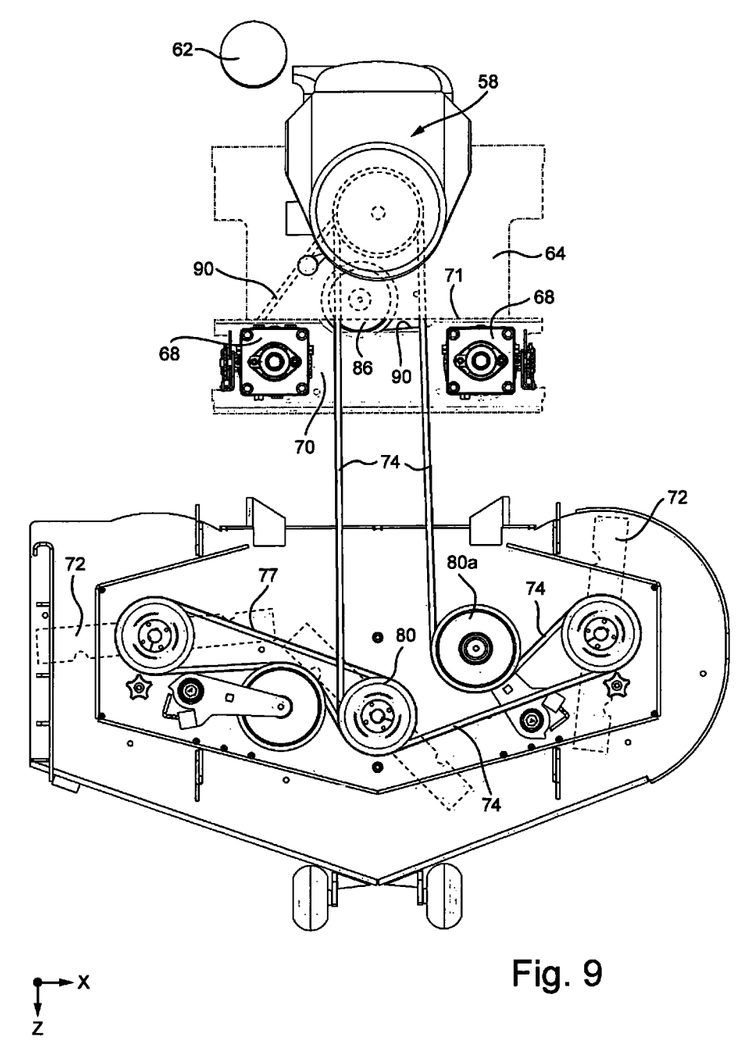
FIG. 9 is a top view of certain components of the mower including the cutter deck assembly, cutter deck pulleys, cutter deck drive belt, pumps and engine of the mower of FIGS. 2-8 (other parts are either omitted from or translucent in this figure for purposes of illustration and understanding).
Figure 10:
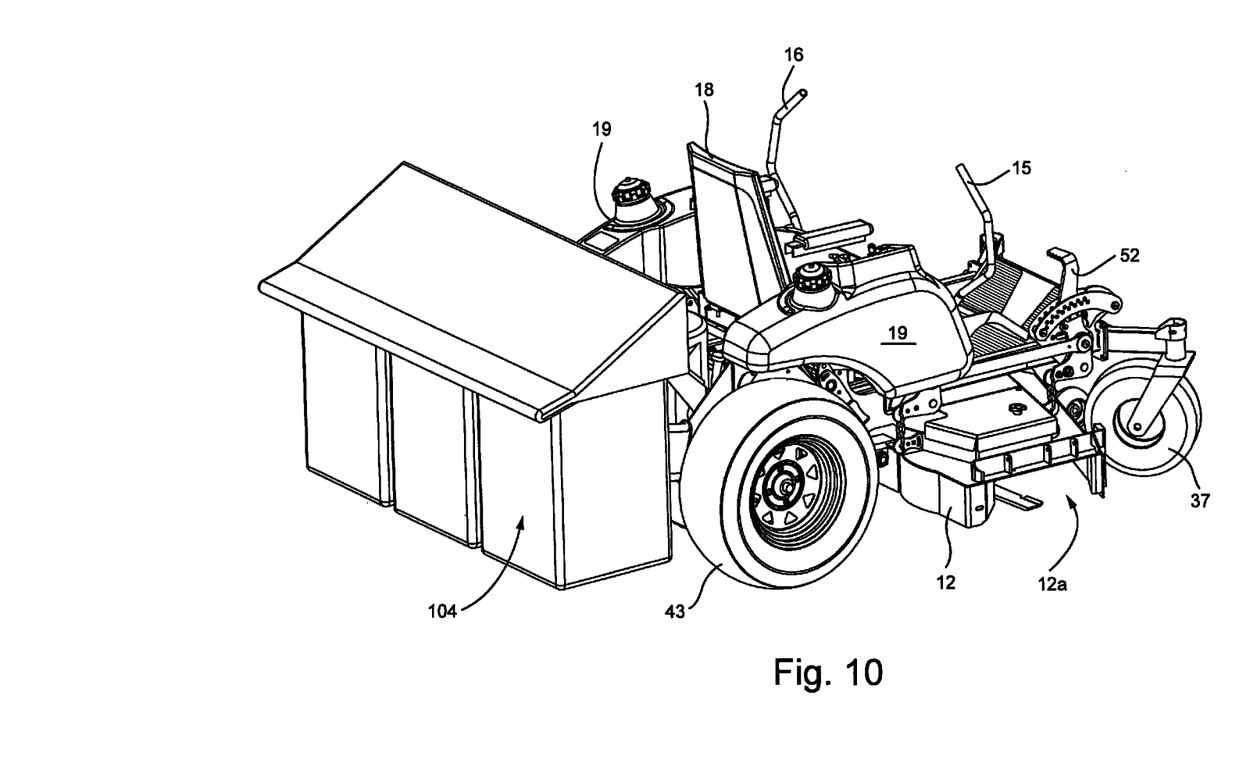
FIG. 10 is a perspective view, taken from the right rear of the mower of FIGS. 2-9, illustrating the mower with a grass catching collection system mounted thereon.
Figure 11:
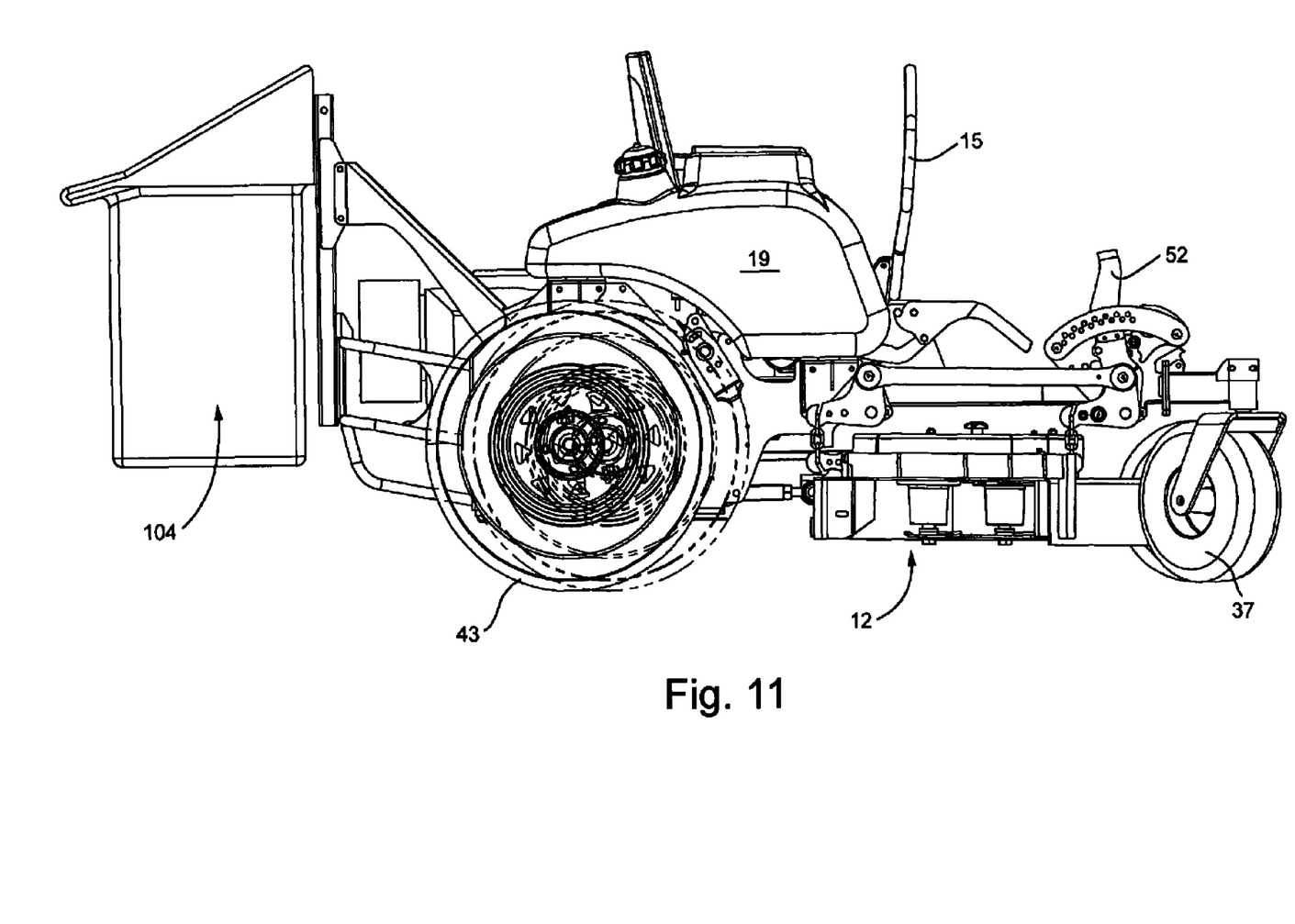
FIG. 11 is a side plan view of the mower of FIG. 10.
Figure 12:
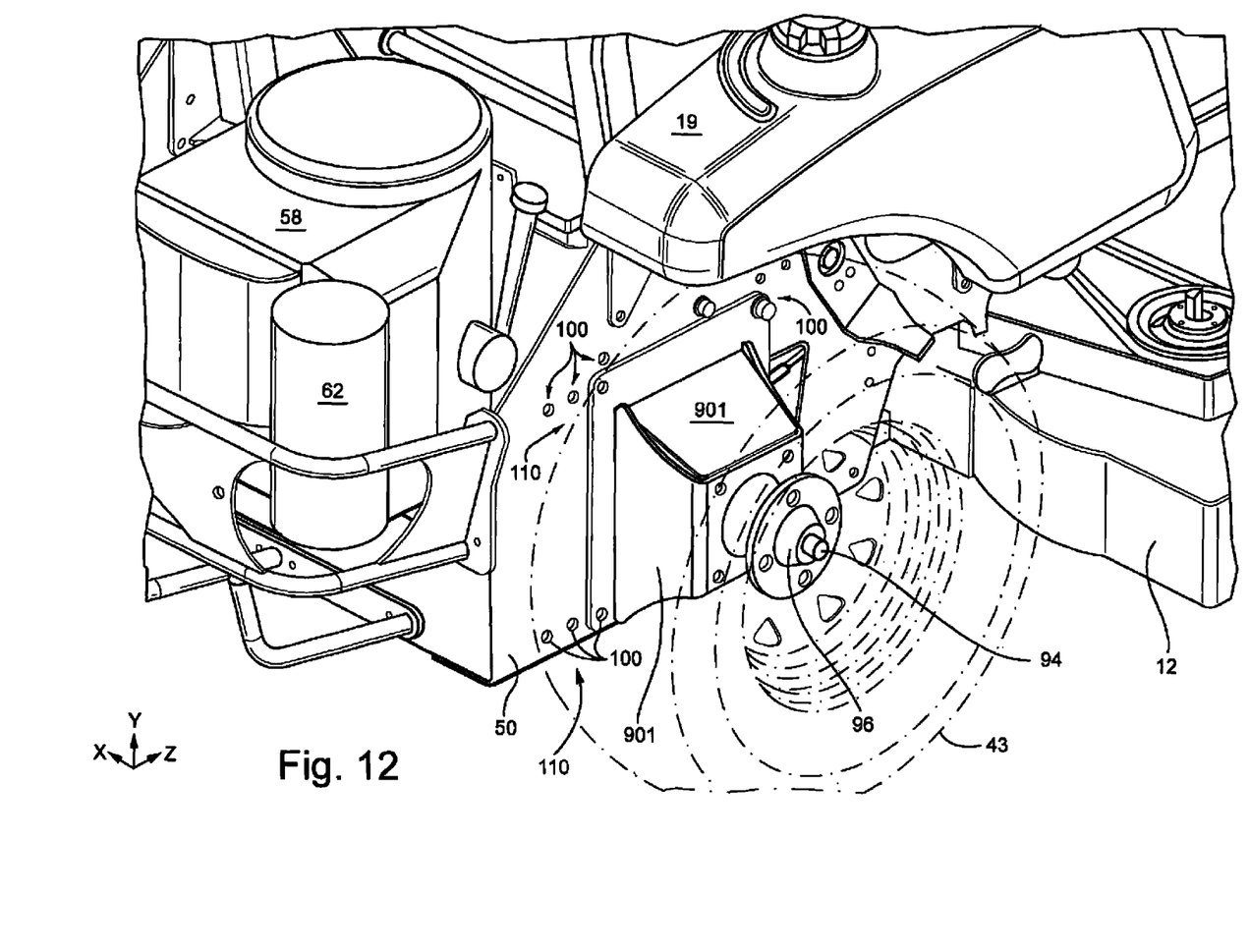
FIG. 12 is a close-up perspective view, taken from the right rear of the mower of FIGS. 2-11, illustrating the rear wheel adjustment system according to an example embodiment of this invention (the right rear drive wheel is shown in a translucent manner in this figure for purposes of simplicity and understanding); this figure showing the right rear drive wheel mounted in its forward-most position.
Figure 13:
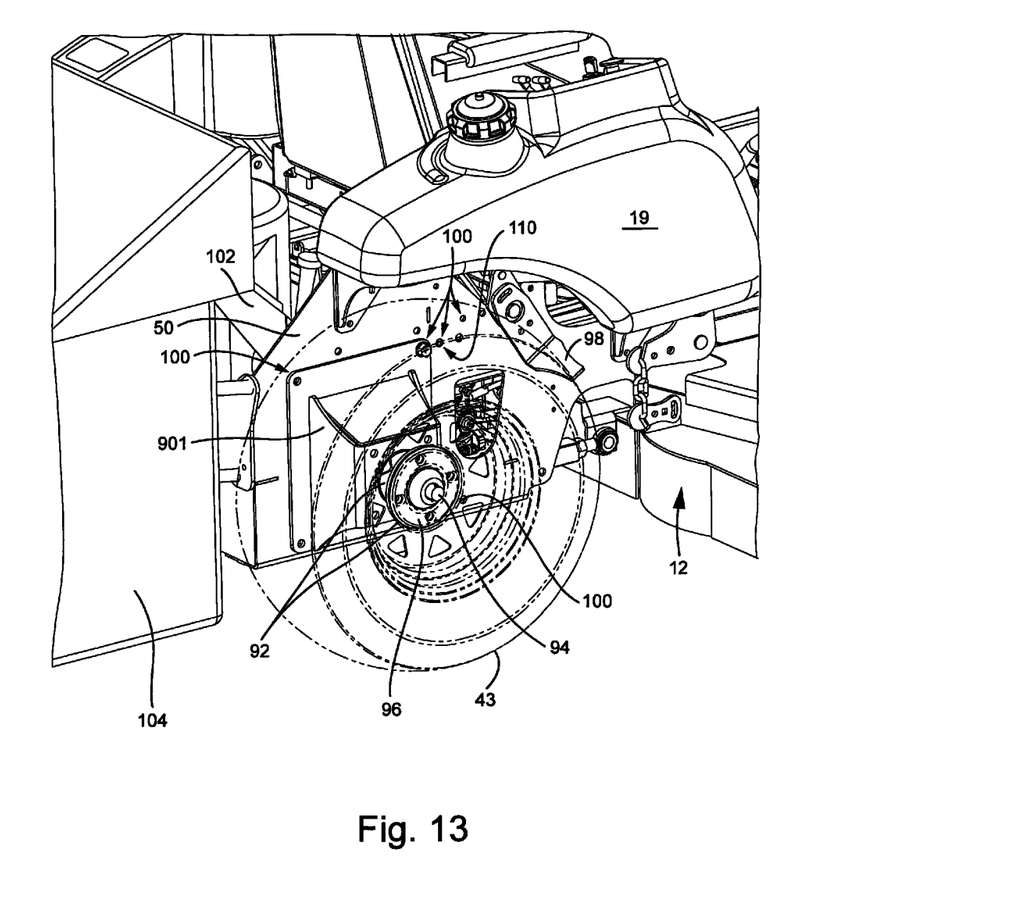
FIG. 13 is a close-up perspective view, taken from the right rear of the mower of FIGS. 2-12, illustrating the rear wheel adjustment system according to an example embodiment of this invention (the right rear drive wheel is shown in dotted lines in this figure for purposes of simplicity and understanding); this figure showing the right rear drive wheel mounted in its rearward-most position.

FIGS. 2-13, for purposes of example only and without limitation, illustrate an example zero radius turning lawn mower according to an example embodiment of this invention. FIG. 2 is a perspective view of the mower; FIG. 3 is a side cross sectional view of the mower; FIGS. 4-5 are split perspective views of the mower showing the right half of the mower only for purposes of illustration and understanding only (the mower has been sliced down the middle in FIGS. 4-5 so that only the right half of the mower is illustrated, and parts that have been sliced are shown cross sectionally); FIG. 6 is a close-up side cross sectional view of the mower; FIG. 7 is a top plan view of the mower although certain components of the mower are either not shown or are translucent in this figure for purposes of illustration and understanding; FIG. 8 is a perspective view of certain components of the mower; FIG. 9 is a top view of certain components of the mower; FIG. 10 is a perspective view illustrating the mower with a grass catching collection system mounted thereon; FIG. 11 is a side plan view of the mower of FIG. 10; and FIGS. 12 and 13 are close-up perspective views of a rear wheel adjustment system according to an example embodiment of this invention.

Referring to FIGS. 2-13, the example mower is of the zero radius turning type and includes cutter deck assembly 12, steering or hand control levers 15, 16 for manipulation by the operator to steer the mower, seat 18 for supporting a sitting operator of the mower, fuel (e.g., gas) tank(s) 19 for holding fuel for the combustion engine, front caster wheels 37, rear drive wheels 43, tractor frame 50, deck lift foot pedal or lever 52 for raising/lowering the cutter deck assembly to adjust the cutting height of the mower or the like, brake lever 54 for applying a braking force to one or more of the rear drive wheels 43 of the mower, control rod 55, oil filter 56, combustion engine 58, engine drive shaft 60 which is driven by the engine 58 and extends downwardly from a bottom portion of the engine 58, muffler 62 for the engine, engine deck 64 upon which the engine 58 is mounted, engine guard 66 for guarding the engine, first and second hydro (hydrostatic or hydraulic) pumps 68 which control the drive speed and direction of the first and second drive wheels 43, respectively, pump deck 70 on which the pumps 68 are mounted, cross wall 71 which is substantially vertical (e.g., vertical plus/minus about 20 degrees) and which extends between at least the pump deck 70 and the engine deck 64, cutting blade(s) 72 provided in the cutter deck assembly 12 for cutting grass, cutter deck drive belt 74 which is driven by the engine 58 and extends between the engine drive shaft 60 and the cutter deck assembly 12, at least one aperture 75 defined in the cross wall 71 through which first and/or second substantially parallel portions of the cutter deck drive belt 74 are fed and move during mower operation, cutter deck engine pulley 76 operatively connected to the engine shaft 60 for rotation therewith and on which the cutter deck drive belt 74 is mounted, electromagnetic clutch/brake 78 operatively connected to the engine shaft 60 for clutching/braking the cutter deck engine pulley 76 and cutter deck drive belt 74 so as to permit the cutter deck drive belt 74 to be selectively actuated by the operator when the engine is running, blade pulley 80 mounted in the cutter deck which supports the end of the cutter deck drive belt 74 opposite the end supported by the pulley 76, additional pulley 80a also driven by the front portion of belt 74, and blade spindle 82 which rotates along with the pulley 76 and permits the belt 74 to drive the cutting blade(s) of the mower. As explained above, in certain example embodiments cross wall 71 is substantially vertical and extends between at least the pump deck 70 and the engine deck 64; however it is possible that wall 71 need not be substantially vertically oriented (e.g., it may be from about 40-70 degrees from vertical) in alternative embodiments of this invention.

Pump belt drive system includes pump drive engine pulley 84 mounted on the engine shaft 60 for rotation therewith, pump drive idler pulley 86, a pump pulley 88 mounted beneath each pump 68 and which rotates with the drive shaft 89 of each corresponding pump, and a pump drive belt 90 which is driven by the engine shaft 60 and which is mounted on each of pulleys 84, 86 and 88. In certain example embodiments, the pulleys 84, 86 and 88 are all substantially in a common plane which is below a plane of the pump deck and which is below a plane of the belt 74. In certain example embodiments, idler pulley 86 is provided on a swinging idler arm and is spring biased to maintain pump belt tension. A single pump belt 90 drives both pumps (via pulleys 84, 86, 88) in certain example embodiments of this invention (such as in the figures); however, in alternative embodiments of this invention one or more additional pump belt(s) may be provided.

As perhaps best shown in FIGS. 12-13 (show right rear drive wheel only; left rear drive wheel has the same structure), the mower further includes, for each of the two rear drive wheels 43, a wheel motor support 901, a hydro wheel motor 92 located behind and partially covered by the wheel motor support 901, a hydro motor axle 94 of the hydro wheel motor 92 which drives the corresponding rear drive wheel 43, a drive wheel hub 96, brake shoe 98, and wheel motor support adjustment holes 100 defined in the tractor frame 50 for allowing the lateral position of each rear drive wheel 43 to be selective adjusted depending upon which holes 100 are used to mount the wheel motor support 901 and wheel 43 on the mower.

Moreover, as perhaps best shown in FIGS. 10-13, optionally, a grass collection system including grass collection adaptor bracket 102 and grass collection container 104 may be mounted on the mower so as to collect grass cut by the mower. Although not shown in the figures, a chute may be provided between the grass discharge opening 12a of the cutter deck assembly and the grass collection container 104 thereby permitting the grass blown out of the opening 12a to make its way into the grass collection container 104. Optionally, the chute may have an impeller provided therein for helping blow the grass back into the container 104.

As can be seen in FIGS. 10-11 and 13, much of the grass collection system, including the grass collection container 104, is mounted on the mower in a position laterally rearward of the rear drive wheels 43 so that the center of gravity of the mower is shifted rearwardly due to the addition of the grass collection system. In order to compensate for such a center of gravity shift, the respective positions of the rear drive wheels 43 are adjustable in certain example embodiments of this invention. In certain example embodiments of this invention, the lateral position of the rear drive wheels 43 may be selectively adjusted as desired by the operator, via adjustment holes 100 defined in the tractor frame 50, in order to move the center of gravity of the mower forward relative to the rear drive wheels in order to compensate for the added weight at the rear portion of the mower due to the grass collection system. In certain example embodiments of this invention, each set 110 of holes includes a plurality (e.g., two, three, or four) holes 100 aligned in a linear manner. In certain example embodiments of this invention, the linear hole arrays of the two top sets may be substantially parallel to those of the bottom two sets. The right and left rear drive wheels 43 are adjustable in the same manner, although only the right rear wheel is shown in FIGS. 10-13.

There are four holes defined in each wheel motor support 901, as shown in FIGS. 12-13, with one hole being defined in each of the four corners of the wheel motor support 901. These holes are positioned so as to match up with corresponding holes 100 defined in the tractor frame 50, with screws or other types of fasteners being used to connect the support 901 to the tractor frame 50 using the lined-up holes. By picking which holes 100 to use to attach the support 901 to the mower, one can adjust the lateral position of the supports 901 and thus of the rear drive wheels 43 on the mower. FIG. 12 shows the right rear drive wheel 43 mounted in its forwardmost position, because in each set 110 of three holes 100 the forwardmost hole 100 was used to mount the support 901 on the mower. In contrast, FIG. 13 shows the right rear drive wheel 43 mounted in its rearwardmost position, because in each set 110 of three holes 100 the rearwardmost hole 100 was used to mount the support 901 on the mower. Typically, when no grass catching container 104 is mounted on the mower, the rear drive wheels 43 are mounted in their forwardmost positions and in each set 110 of three holes 100 the forwardmost hole 100 is used to mount the support 901 on the mower (see FIG. 12). However, when a grass collection system including a very heavy container 104 is mounted on the mower, the rear drive wheels 43 are typically mounted in their rearwardmost positions and in each set 110 of three holes 100 the rearwardmost hole 100 is used to mount the support 90 on the mower (see FIG. 13). When a medium weight grass collecting container 104 is mounted on the mower, the rear drive wheels 43 may be mounted in their mid positions and in each set 110 of three holes 100 the center hole 100 is used to mount the support 901 on the mower. Accordingly, it is possible to move the center of gravity of the mower forward relative to the rear drive wheels 43 in order to compensate for the added weight at the rear portion of the mower due to the grass collection container 104 if desired; this may reduce or eliminate the need for counterweights on the front of the mower in certain example embodiments of this invention.

In certain example embodiments of this invention, components such as the tractor frame 50, wheel motor support 901, pump deck 70, engine deck 64 and cutter deck are made of sheet metal. However, it is possible that other materials may instead be used to fabricate these components.

In certain example embodiments, the mower is a riding mower, and the seat 18 of the mower is positioned laterally forward of at least part of the engine 58. However, in alternative embodiments of this invention the mower may be operated by a standing operator or the like and seat 18 may or may not be provided. While this invention may be implemented on a mid-mount Z type mower in certain example embodiments of this invention, this invention is not so limited and may also be implemented on other types of mowers.

As perhaps best shown in FIGS. 4, 7, 8 and 9, the mower may include first 74 and second 77 cutter deck drive belts both being located at elevation(s) or in plane(s) above the pump belt 90. In FIGS. 7-9, it can be seen that both cutter deck drive belts 74, 77 are mounted on pulley 80 but at slightly different elevations, so that pulley 80 allows drive from the engine to be transferred to belt 77 via belt 74. Each belt 74, 77 may drive different cutting blade(s) of the mower. Other belts may be provided in alternative embodiments of this invention; and only a single belt may be provided in still further alternative embodiments of this invention.

In certain example embodiments, the height of the cutter deck assembly 12 and thus the cutting height of the mower is adjustable. In certain example embodiments, the cutter deck assembly 12 moves upwardly and downwardly to adjust a cutting height of the mower and is not fixedly connected to the engine deck, so that the engine deck does not move upwardly and downwardly along with the cutter deck assembly.

In certain example embodiments of this invention, the lawn mower includes first and second drive wheels 43, a first pump 68 for controlling the speed and direction of the first drive wheel (via a non-shown wheel motor), a second pump 68 for controlling the speed and direction of the second drive wheel (via a non-shown wheel motor), the first and second drive wheels 43 being independently drivable via the pumps 68 in both forward and reverse directions so as to permit zero radius turning of the mower. The steering control levers 15, 16 are connected independently to the swash plate of its controlled pump 68 so as to permit the operator to cause variable speeds in forward, reverse and neutral for each drive wheel 43.

As shown in the figures, the engine 58 includes an engine drive shaft 60 extending downwardly, or in any other suitable direction, from a bottom or other side of the engine. The cutter deck drive belt 74 for driving at least one cutting blade of the mower, directly or indirectly, is driven by the engine drive shaft 60 via cutter deck engine pulley 76 and extends between the engine drive shaft 60 at a rear portion of the mower and the cutter deck assembly 12 at a front or mid portion of the mower. The pump belt 90 for driving at least one of the first and second pumps 68 is also driven by the engine drive shaft 60 via pump drive engine pulley 84. While the pump belt 90 drives both pumps 68 in the illustrated example embodiment, it is possible that first and second different pump belts may be provided for driving the first and second pumps, respectively, in alternatively example embodiments of this invention.

The cutter deck drive belt 74 and the pump belt 90 are operable to be positioned substantially parallel (parallel plus/minus about 20 degrees) to one another when viewed from the side, and thus at substantially parallel different elevations, during at least some mower operations. As shown in the figures, the cutter deck drive belt 74 is located at an elevation above an elevation of the pump belt 90. It will be appreciated that the cutter deck drive belt 74 may tilt when the cutter deck assembly 12 is moved upward/downward in order to adjust the height of the mower, but most if not all of the belt 74 is still located at an elevation above that of the pump belt in certain example embodiments of this invention. In this respect, the pumps 68 are mounted on an upper surface of pump deck 70, and the upper surface of the pump deck 70 on which the pumps are mounted is at an elevation below the upper surface of the engine deck 64 on which the engine 58 is mounted. In certain example instances, this may call for the engine shaft 60 being slightly longer than normal. These surfaces of the pump and engine decks are substantially parallel to one another in certain example embodiments of this invention, although this need not be the case in alternative embodiments. In certain example embodiments of this invention, the positioning of the pump belt below that of the cutter deck drive belt permits the engine and/or pumps to be lowered so as to be closer to the ground, which is advantageous in that it permits the center of gravity of the mower to be lowered by permitting the hydro pumps and/or engine of the mower to be positioned at a lower elevation so as to improve hill holding and other similar characteristics of the mower. In certain example non-limiting instances, the positioning of the belts and pulleys discussed herein has permitted the applicant to lower the engine from about two to three inches and to lower the pumps from about five to six inches which has significantly lowered the center of gravity of the mower and provided for a significantly better overall product.

As perhaps best shown in FIGS. 7-9, the pumps 68 are spaced apart from one another on the pump deck 70 with a space provided therebetween, so that the first pump is closer to a right side R of the mower and the second pump is closer to a left side L of the mower. The cutter deck drive belt 74 extends through the space between the pumps 68 (as viewed from above as in FIGS. 7-9) and is thus located at an elevation common with at least part of each of the pumps (as viewed from the side). Further in this respect, the substantially vertically extending cross wall 71 is located between a rear end of the upper surface of the pump deck 70 and a front end of the upper surface of the engine deck 64, and has a hole(s) 75 defined therein, and the cutter deck drive belt 74 extends through the hole 75 defined in the substantially vertically extending wall 71 thereby permitting the belt 74 to be located higher on the mower. These features are advantageous in that they permit an efficient path for the belt 74, and allow the belt 74 to be positioned above the pump belt 90 which is helpful to lower the center of gravity of the mower.

While two pumps 68 are used in the illustrated embodiments of this invention, this invention is not so limited. It is possible that only one pump 68 may be used to drive one or more drive wheels 43 in certain alternative example embodiments of this invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A self-propelled lawn mower comprising:
   first and second rear drive wheels;
   a first pump for controlling the first drive wheel, and a second pump for controlling the second drive wheel, the first and second drive wheels being independently drivable via the pumps in both forward and reverse directions so as to permit zero radius turning of the mower, and wherein a first wheel motor is provided between the first rear drive wheel and the first pump and a second wheel motor is provided between the second rear drive wheel and the second pump;
   at least one cutting blade for cutting grass;
   means for mounting a grass collection system on the mower, the grass collection system including a grass collecting container adapted to be mounted rearwardly of the rear drive wheels; and
   adjustment means for adjusting the positions of the rear drive wheels relative to a frame of the mower, the adjustment means permitting the rear drive wheels to be moved forward, away from the grass collecting container and rearward toward the grass collecting container.

2. The mower of claim 1, wherein the adjustment means includes first, second, third and fourth sets of holes defined in a vertically extending wall of the mower, wherein each of the first, second, third and fourth sets comprises a plurality of holes aligned in a linear manner.

3. The mower of claim 2, wherein the holes of the first and second sets are aligned in a manner so as to be parallel to the holes of the third and fourth sets.

4. The mower of claim 3, wherein the holes are defined in a tractor frame of the mower.

5. The mower of claim 2, wherein each of the first, second, third and fourth sets comprises at least three holes.

6. The mower of claim 1, further comprising means for adjusting the lateral positions of the first and second wheel motors for the rear drive wheels relative to the frame of the mower, the means for adjusting for permitting the wheel motors to be moved forward, away from the grass collecting container, to compensate for weight added by addition of the grass collecting container, and rearward to compensate for weight removed by removal of the grass collecting container.

7. The mower of claim 1, further comprising means for adjusting the lateral positions of first and second metal wheel motor supports for the rear drive wheels relative to the frame of the mower, the means for adjusting for permitting the wheel motor supports to be moved, along with the corresponding rear drive wheels, forward, away from the grass collecting container, to compensate for weight added by addition of the grass collecting container, and rearward to compensate for weight removed by removal of the grass collecting container.

* * * * *